US011356633B2

(12) United States Patent
Endo et al.

(10) Patent No.: US 11,356,633 B2
(45) Date of Patent: Jun. 7, 2022

(54) VIDEO SIGNAL PROCESSING APPARATUS, VIDEO SIGNAL PROCESSING METHOD, AND VIDEO SIGNAL PROCESSING SYSTEM

(71) Applicant: SONY CORPORATION, Tokyo (JP)

(72) Inventors: Tomoyuki Endo, Tokyo (JP); Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 16/332,649

(22) PCT Filed: Aug. 10, 2017

(86) PCT No.: PCT/JP2017/029124
§ 371 (c)(1),
(2) Date: Mar. 12, 2019

(87) PCT Pub. No.: WO2018/055945
PCT Pub. Date: Mar. 29, 2018

(65) Prior Publication Data
US 2020/0296323 A1   Sep. 17, 2020

(30) Foreign Application Priority Data

Sep. 20, 2016   (JP) .............................. JP2016-183533

(51) Int. Cl.
*H04N 7/01*        (2006.01)
*H04N 11/20*       (2006.01)
(Continued)

(52) U.S. Cl.
CPC ......... *H04N 7/0117* (2013.01); *H04N 7/0125* (2013.01); *H04N 9/8722* (2013.01); *H04N 21/4402* (2013.01)

(58) Field of Classification Search
CPC ...... H04N 7/01; H04N 7/0117; H04N 7/0125; H04N 9/8722; H04N 11/20; H04N 21/4402
(Continued)

(56) References Cited

U.S. PATENT DOCUMENTS 9,264,681 B2 * 2/2016 Gish ..................... H04N 9/68
9,967,533 B2 * 5/2018 Toma ..................... H04N 5/20
(Continued)

FOREIGN PATENT DOCUMENTS

JP    10-319922 A    12/1998
JP    2016-111692 A   6/2016
(Continued)

OTHER PUBLICATIONS

International Search Report dated Nov. 14, 2017 in PCT/JP2017/029124, 1page.
(Continued)

*Primary Examiner* — Trang U Tran
(74) *Attorney, Agent, or Firm* — Oblon, McClelland, Maier & Neustadt, L.L.P.

(57) ABSTRACT

[Object] To contribute to the achievement of a workflow in which an HDR video and an SDR video are compatible with each other.
[Solving Means] This video signal processing apparatus includes an HDR video generation unit including a first converter unit that performs OOTF conversion on an HDR video by using an exponentiation function for calculating an exponentiation of 1.2, where 100% is 1, to an input signal level of the HDR video having a range from a point of 0%, where an expression range of an input signal level of an SDR video is 100%, to a change point optionally determined within a range of 100% to 500%, and by using a linear function for multiplying an input signal level of the HDR
(Continued)

video having a range higher than the change point by a predetermined coefficient to maintain a change rate of a calculation result in a portion of the change point calculated by using the exponentiation function.

9 Claims, 7 Drawing Sheets

(51) Int. Cl.
*H04N 9/87* (2006.01)
*H04N 21/4402* (2011.01)

(58) Field of Classification Search
USPC .................................................. 348/441, 453
See application file for complete search history.

(56) References Cited

U.S. PATENT DOCUMENTS

| | | | |
|---|---|---|---|
| 2016/0344990 | A1 | 11/2016 | Kozuka et al. |
| 2017/0085827 | A1 | 3/2017 | Terada et al. |
| 2017/0264859 | A1 | 9/2017 | Drugeon et al. |
| 2017/0272719 | A1 | 9/2017 | Kozuka et al. |
| 2018/0199412 | A1 | 7/2018 | Drugeon et al. |
| 2018/0352632 | A1 | 12/2018 | Drugeon et al. |

FOREIGN PATENT DOCUMENTS

| | | |
|---|---|---|
| WO | WO 2015/190044 A1 | 12/2015 |
| WO | WO 2016/047085 A1 | 3/2016 |
| WO | WO 2016-047085 A1 | 3/2016 |

OTHER PUBLICATIONS

"High Dynamic Range Television for Production and International Programme Exchange", Broadcasting service (television), Report ITU-R BT.23 90-0, 2016 [online], [retrieval date Nov. 1, 2017], Internet: <URL:h ttps://www.itu.int/dms pub/itu-r/opb/rep/soumu.go.jp/R-REP-BT.2390- 2016-PDF- E.pdf>, pp. 16-17 and cover pages.

Extended European Search Report dated Jun. 18, 2019 in Patent Application No. 17852726.3, 9 pages.

Tim Borer, et al., "Approaches to High Dynamic Range Video" 2016 Digital Media Industry & Academic Forum (DMIAF), IEEE, XP032970617, Jul. 4, 2016, pp. 71-76.

Tim Borer, "Non-linear Opto-Electrical Transfer Functions for High Dynamic Range Television" BBC Research & Development White Paper WHP 283, XP055275016, Jul. 1, 2014, pp. 1-20 and cover pages.

Anonymous: "Report ITU-R BT.2390-0 High Dynamic Range Television for Production and International Programme Exchange BT Series Broadcasting Service (Television)" International Telecommunication Union, XP055383019, Jan. 1, 2016, pp. 1-38 and cover pages.

\* cited by examiner

VIDEO SIGNAL PROCESSING APPARATUS, VIDEO SIGNAL PROCESSING METHOD, AND VIDEO SIGNAL PROCESSING SYSTEM

TECHNICAL FIELD

The present technology relates to a video signal processing apparatus, a video signal processing method, and a video signal processing system that are capable of processing an HDR video signal and an SDR video signal.

BACKGROUND ART

In HDR (High Dynamic Range) imaging, it is possible to express a video with a wide dynamic range, and express high luminance and high luminance colors, which are hard to express with a video signal of SDR (Standard Dynamic Range). The video signal of SDR has a standard dynamic range and can be displayed on a normal monitor.

In the workflow of the HDR imaging, an OOTF (Opto-Optical Transfer Function) receives attention. The OOTF is a transfer function between a real scene and the light of a display and is used for the purpose of "image creation" in which visual impressions of them are determined.

In the SDR, by an OETF (Opto-Electronic Transfer Function) in the ITU-R BT.709 and an EOTF (Electronic-Opto Transfer Function) in the ITU-R BT.1886, linear pixel signals obtained in an imaging apparatus are output as an SDR video having non-linear OOTF characteristics on the display.

On the other hand, in the HDR, the OETF and the EOTF prescribed in the ITU-R BT.2100 have completely symmetrical characteristics, and thus adding the OOTF characteristics voluntarily is prescribed. The OOTF currently defined in the ITU-R BT.2100 includes two types, i.e., an HLG (Hybrid Log-Gamma) OOTF and a PQ (Perceptual Quantization) OOTF.

Patent Literature 1 discloses a method of encoding an HDR video and an SDR video together.

CITATION LIST

Patent Literature

Patent Literature 1: Japanese Unexamined Patent Application Publication No. 2015-506623

DISCLOSURE OF INVENTION

Technical Problem

In recent years, the workflow for the HDR video has been launched, but the environment in which the workflow for the SDR video is mainly used remains. Therefore, there is a demand for a workflow in which the HDR video and the SDR video are compatible with each other.

It is an object of the present technology to provide a video signal processing apparatus, a video signal processing method, and a video signal processing system that contribute to the achievement of a workflow in which an HDR video and an SDR video are compatible with each other.

Solution to Problem

In order to solve the above problem, a video signal processing apparatus of an embodiment according to the present technology includes an HDR video generation unit including a first converter unit that performs OOTF conversion on an HDR video by using an exponentiation function for calculating an exponentiation of 1.2, where 100% is 1, to an input signal level of the HDR video having a range from a point of 0%, where an expression range of an input signal level of an SDR video is 100%, to a change point optionally determined within a range of 100% to 500%, and by using a linear function for multiplying an input signal level of the HDR video having a range higher than the change point by a predetermined coefficient to maintain a change rate of a calculation result in a portion of the change point calculated by using the exponentiation function.

The video signal processing apparatus may further include an SDR video generation unit including a second converter unit that performs OETF conversion of ITU-R BT.709 on an input video signal to generate an SDR video.

The video signal processing apparatus may be configured to simultaneously generate the HDR video and the SDR video from the input video signal.

A video signal processing method of another embodiment according to the present technology includes performing OOTF conversion on an HDR video by using an exponentiation function for calculating an exponentiation of 1.2, where 100% is 1, to an input signal level of the HDR video having a range from a point of 0%, where an expression range of an input signal level of an SDR video is 100%, to an change point optionally determined within a range of 100% to 500%, and by using a linear function for multiplying an input signal level of the HDR video having a range higher than the change point by a predetermined coefficient to maintain a change rate of a calculation result in a portion of the change point calculated by using the exponentiation function.

A video signal processing system of another embodiment according to the present technology includes: a video signal generation apparatus that generates an HDR video and an SDR video; an HDR monitor that performs signal processing for displaying the HDR video generated by the video signal generation apparatus on a first monitor; and an SDR monitor that performs signal processing for displaying the SDR video generated by the video signal generation apparatus on a second monitor.

The video signal generation apparatus includes an HDR video generation unit including a first converter unit that performs OOTF conversion on the HDR video by using an exponentiation function for calculating an exponentiation of 1.2, where 100% is 1, to an input signal level of the HDR video having a range from a point of 0%, where an expression range of an input signal level of the SDR video is 100%, to a change point optionally determined within a range of 100% to 500%, and by using a linear function for multiplying an input signal level of the HDR video having a range higher than the change point by a predetermined coefficient to maintain a change rate of a calculation result in a portion of the change point calculated by using the exponentiation function, and an SDR video generation unit including a second converter unit that performs OETF conversion of ITU-R BT.709 on an input video signal to generate an SDR video.

The SDR monitor includes an SDR video signal processing unit that performs gamma processing using an EOTF of ITU-R BT.1886 on the SDR video generated by the video signal generation apparatus.

Advantageous Effects of Invention

As described above, according to the present technology, it is possible to provide a video signal processing apparatus, a video signal processing method, and a video signal processing system that contribute to the achievement of a workflow in which an HDR video and an SDR video are compatible with each other.

MODE(S) FOR CARRYING OUT THE INVENTION

Hereinafter, an embodiment according to the present technology will be described.

First Embodiment

[Configuration of Video Signal Processing System]

Figure 1:
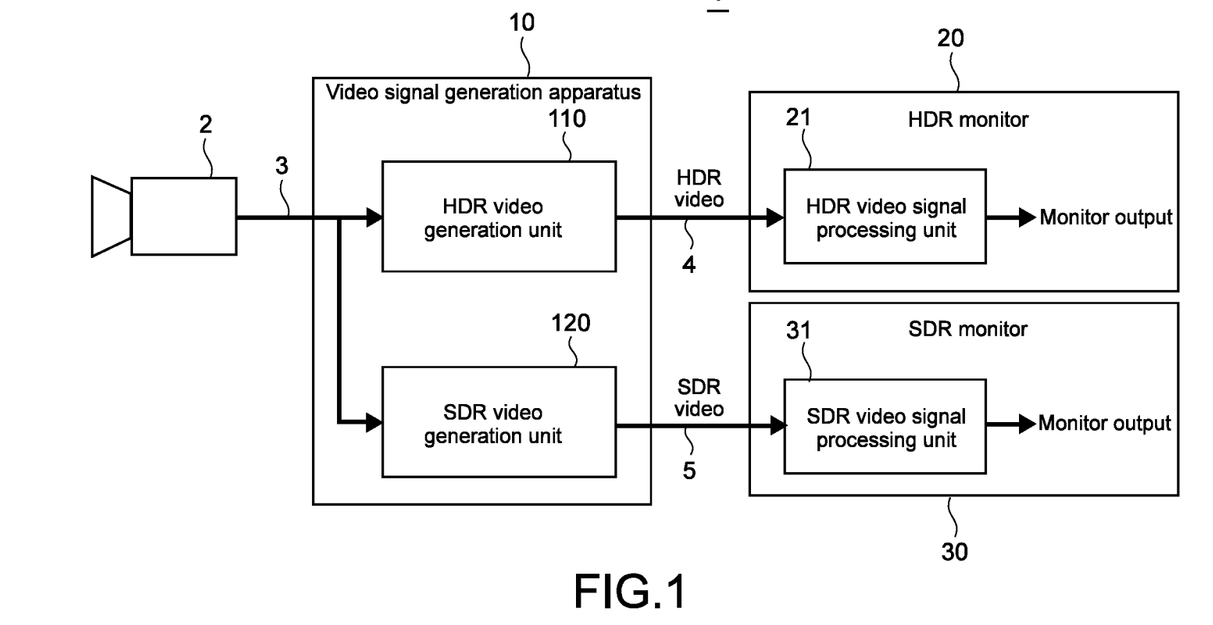
FIG. 1 is a block diagram showing the overall configuration of a video signal processing system of a first embodiment according to the present technology.

FIG. 1 is a block diagram showing the overall configuration of a video signal processing system 1 of a first embodiment according to the present technology.

The video signal processing system 1 includes a video signal generation apparatus 10 capable of receiving a pixel signal transmitted from an imaging apparatus 2 and simultaneously generating an HDR video signal and an SDR video signal, an HDR monitor 20 that displays the HDR video signal transmitted from the video signal generation apparatus 10, and an SDR monitor 30 that displays the SDR video signal transmitted from the video signal generation apparatus 10.

The imaging apparatus 2 includes an image sensor such as a CMOS (Complementary Metal-Oxide-Semiconductor) device or a CCD (Charge-Coupled Device). The image sensor converts light taken in through an optical system into an electrical pixel signal corresponding to the light intensity. In the imaging apparatus, the pixel signal output from the image sensor is subjected to processing such as signal correction processing including defect correction, lens aberration correction, or the like and is transmitted to the video signal generation apparatus 10 through a camera cable 3.

The video signal generation apparatus 10 includes an HDR video generation unit 110 and an SDR video generation unit 120. The pixel signal transmitted from the imaging apparatus 2 to the video signal generation apparatus 10 through the camera cable 3 is supplied to the HDR video generation unit 110 and the SDR video generation unit 120.

The HDR video generation unit 110 performs processing of generating an HDR video signal while variously adjusting the pixel signal supplied from the imaging apparatus 2 on the basis of parameter information for adjusting the HDR. The HDR video signal generated by the HDR video generation unit 110 is transmitted to the HDR monitor 20 through an HDR transmission path 4.

The SDR video generation unit 120 performs processing of generating an SDR video signal while variously adjusting the pixel signal supplied from the imaging apparatus 2 on the basis of parameter information for adjusting the SDR. The SDR video signal generated by the SDR video generation unit 120 is transmitted to the SDR monitor 30 through an SDR transmission path 5.

The HDR video generation unit 110 and the SDR video generation unit 120 are each configured by one or a plurality of integrated circuits or the like.

[Configurations of HDR Video Generation Unit 110 and SDR Video Generation Unit 120]

Figure 2:
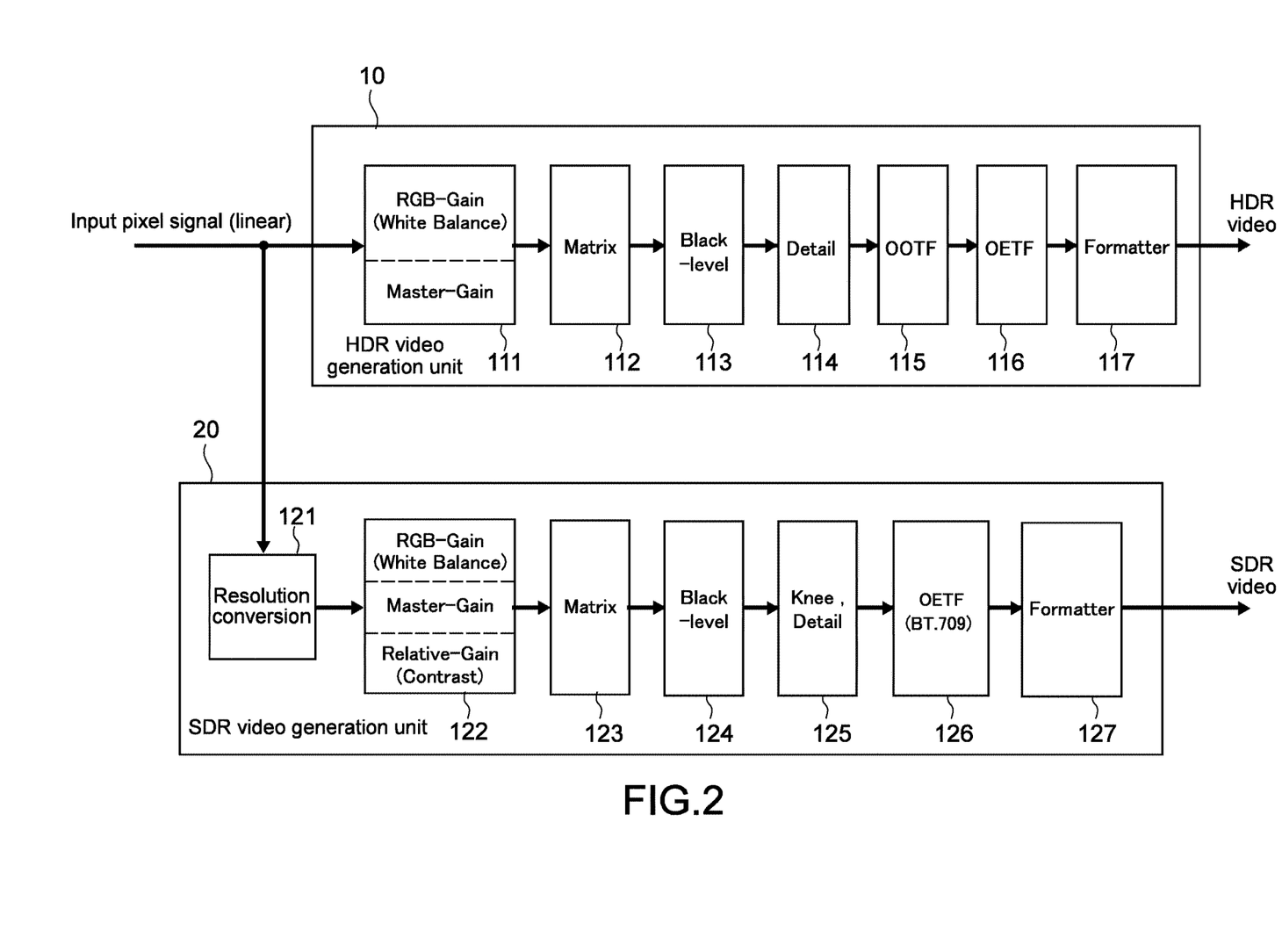
FIG. 2 is a block diagram showing functional configurations of an HDR video generation unit and an SDR video generation unit in the video signal generation apparatus shown in FIG. 1.

FIG. 2 is a block diagram showing functional configurations of the HDR video generation unit 110 and the SDR video generation unit 120.

The HDR video generation unit 110 includes an HDR gain adjustment unit 111, a matrix processing unit 112, a black-level correction unit 113, a detail processing unit 114, an OOTF unit 115, an OETF unit 116, and a formatter 117.

The HDR gain adjustment unit 111 performs the control of an RGB gain for adjusting white balance, other than the control of a master gain.

The matrix processing unit 112 performs Debayer processing, linear matrix processing, or the like on the pixel signal, which has passed through the HDR gain adjustment unit 111, on the basis of color gamut information (HDR-Color Gamut) that is part of the parameter information for adjusting the HDR, to obtain color image data.

The black-level correction unit 113 corrects the black level of the color image data on the basis of information for black-level correction (HDR-Black) that is part of the parameter information for adjusting the HDR.

The detail processing unit 114 performs processing for details of the color image data.

The OOTF unit 115 (first converter unit) performs conversion processing using an OOTF (Opto-Optical Transfer Function), which is part of the parameter information for adjusting the HDR, on the color image data such that the visibility of the HDR video on the display of the HDR monitor 20 is brought closer to a realistic scene.

The OETF unit 116 performs gamma signal processing using an OETF (Optical-Electro Transfer Function) on the color image data on the basis of OETF information that is part of the parameter information for adjusting the HDR.

The formatter 117 converts the color image data, which has passed through the OETF unit 116, to have a transmission format of the HDR video.

Meanwhile, the SDR video generation unit 120 includes a resolution converter unit 121, an SDR gain adjustment unit 122, a matrix processing unit 123, a black-level correction unit 124, a knee/detail processing unit 125, a gamma processing unit 126, and a formatter 127.

The resolution converter unit 121 converts the resolution of the pixel signal transmitted by the imaging apparatus 2 (e.g., 4K resolution) into the HD resolution.

The SDR gain adjustment unit 122 performs the control of a master gain on the basis of a relative gain that is part of the parameter information for adjusting the SDR, and also performs the control of an RGB gain for adjusting white balance.

The relative gain is a parameter indicating a ratio of the gain relative to the pixel signal in the HDR process to the gain relative to the pixel signal in the SDR process in order to enable a contrast ratio between the HDR video and the SDR video to be adjusted. For example, a relative range defines how many times the dynamic range of the HDR video is set relative to the dynamic range of the SDR video. With this relative range, the ratio of the master gain on the SDR process side to the master gain on the HDR process side can be set to, for example, an optional ratio such as 1 or ½. In such a manner, if the ratio of the master gain on the HDR process side to the master gain on the SDR process side is set, the dynamic range of the HDR video having a correlation with the dynamic range of the SDR video is obtained.

More specifically, the reference upper limit of the dynamic range of the SDR video is given by reference white (Diffuse-White) selected by a creator. In this embodiment, when the reference white (Diffuse-White) of the SDR video is selected, the reference upper limit of the dynamic range of the HDR video (reference white (Diffuse-White) of HDR video) is also determined on the basis of the correlation based on the relative range.

It should be noted that a luminance dynamic range of the HDR video is wider than a luminance dynamic range of the SDR video. As an example, assuming that the luminance dynamic range of the SDR video is 0 to 100%, the luminance dynamic range of the HDR video is, for example, 100% to 1000%, or 100% to 10000%. The luminance range of the output of the imaging apparatus 2 is 0 to 600%, or the like.

The matrix processing unit 123 performs Debayer processing, linear matrix processing, or the like on the pixel signal, which has passed through the SDR gain adjustment unit 122, on the basis of color gamut information (SDR-Color Gamut) that is information regarding the color of the SDR video, to obtain color image data.

The black-level correction unit 124 corrects the black level of the color image data on the basis of information for black-level correction (SDR-Black).

The knee/detail processing unit 125 performs knee correction on the color image data on the basis of information regarding knee correction (KNEE) and also performs processing for details.

The gamma processing unit 126 (second converter unit) performs gamma signal processing on the dynamic range set for the SDR gain adjustment unit 122 on the basis of information regarding the compression of the dynamic range (SDR-D-Range-Gamma) and simultaneously performs gamma signal processing for the display of the ITU-R BT.709.

The formatter 127 converts the color image data to have a transmission format of the SDR video.

Each piece of parameter information used in the above-mentioned HDR video generation unit 110 and SDR video generation unit 120 is set by a creator such as a VE (Video Engineer) who operates an operation apparatus connected to the CPU (not shown) of the video signal generation apparatus 10 via a communication path such as a LAN (Local Area Network).

[Regarding OOTF]

The OOTF (Opto-Optical Transfer Function) is a transfer function between a real scene and the light of a monitor and is used for the purpose of "image creation" in which visual impressions of the real scene and the video on the monitor are determined. As a typical OETF for the HDR video, an HLG (Hybrid Log-Gamma) OETF and a PQ (Perceptual Quantization) OETF are known. However, typical OOTF characteristics thereof are different from the OOTF characteristics of the SDR video.

Figure 3:
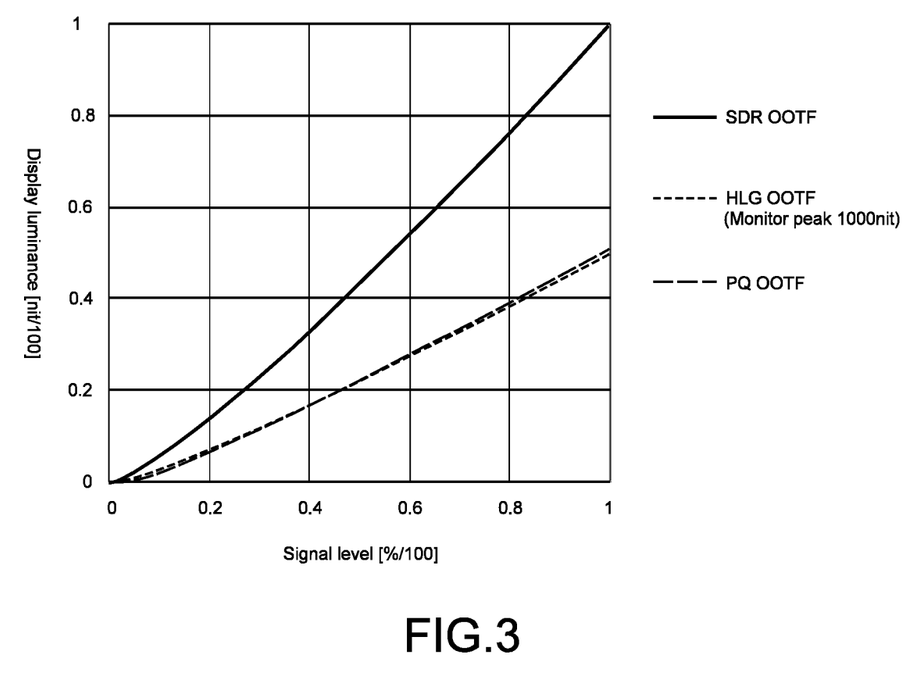
FIG. 3 is a graph in which OOTF characteristics of an SDR video are compared with OOTF characteristics of HLG and OOTF characteristics of PQ.
Figure 4:
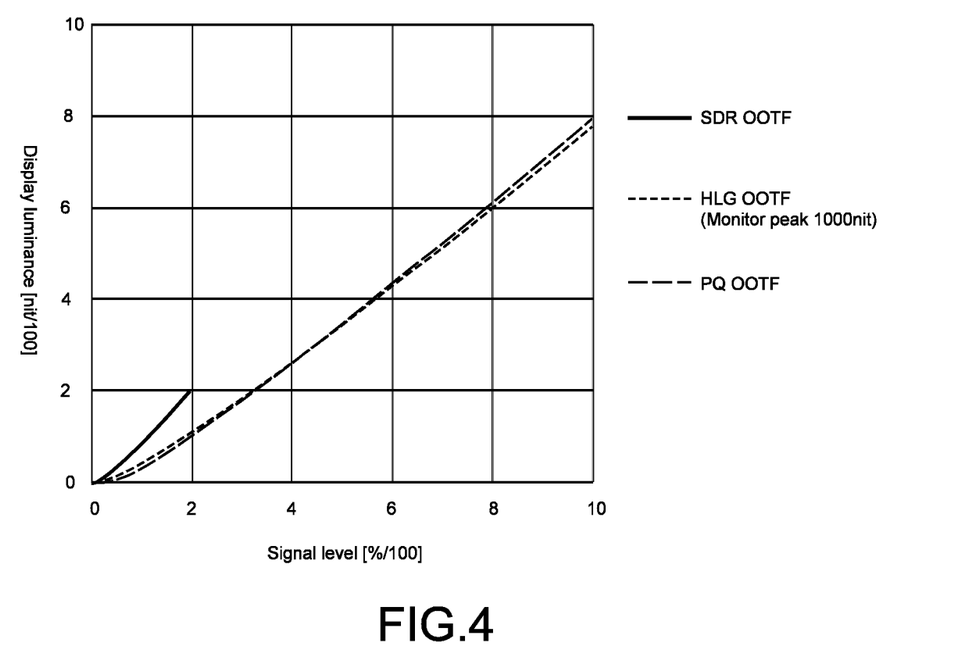
FIG. 4 is a graph obtained by enlarging the graph of FIG. 3 to the range of 1000%.
Figure 5:
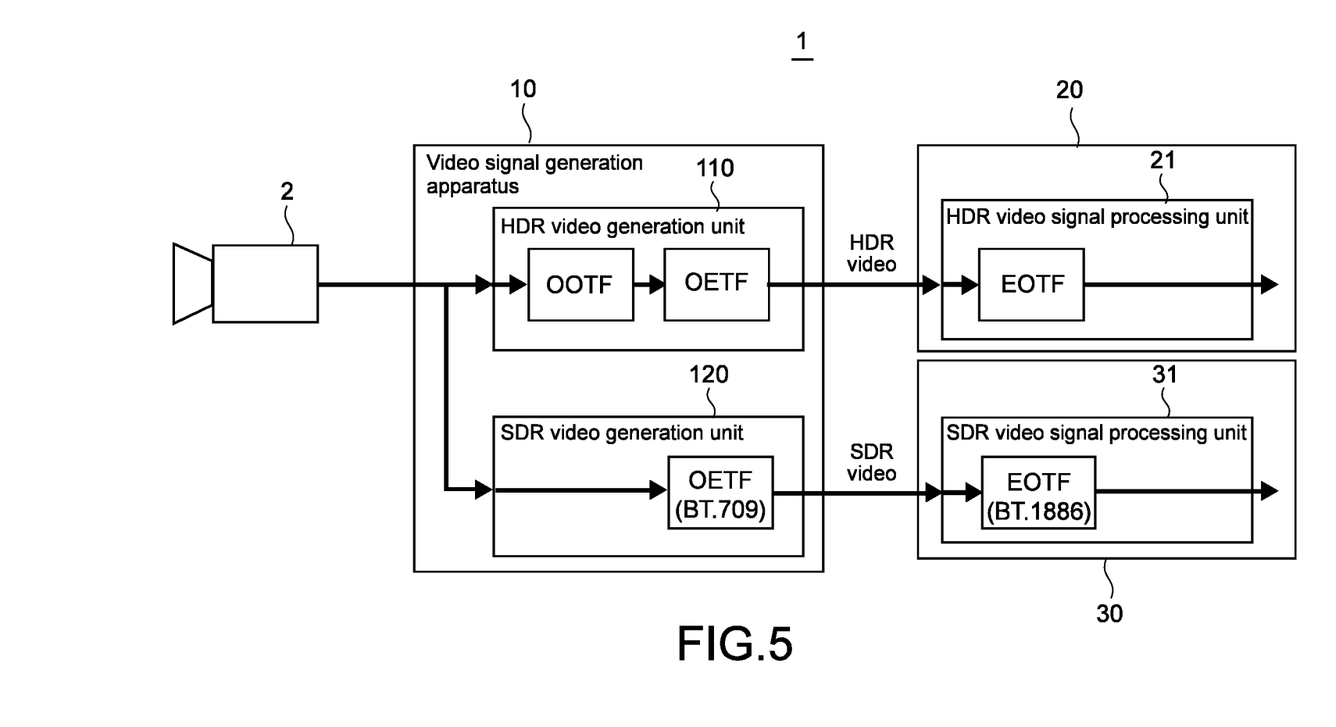
FIG. 5 is a block diagram for describing OETF conversion and EOTF conversion for the SDR video in the video signal processing system shown in FIG. 1.

FIG. 3 is a graph in which the OOTF characteristics of an SDR video are compared with the OOTF characteristics of HLG and the OOTF characteristics of PQ when gamma processing using the OETF of the ITU-R BT.709 is performed by the gamma processing unit 126 of the SDR video generation unit 120, and gamma processing using the EOTF of the ITU-R BT.1886, which is a recommended gamma for a flat panel display, is performed by the SDR video signal processing unit 31 of the SDR monitor 30 as shown in FIG. 5. This graph shows the OOTF characteristics of HLG and the OOTF characteristics of PQ in the range of 100%, where an expression range of the SDR video is 100%. Further, FIG. 4 is a graph obtained by enlarging the graph of FIG. 3 to the range of 1000%.

As seen from those graphs, since the OOTF characteristics of HLG and the OOTF characteristics of PQ have deviations from the OOTF characteristics of the SDR video, the visibility of the HDR video and the visibility of the SDR video on the monitor have been different from each other.

In order to solve such a problem, in the video signal processing system 1 of this embodiment, the OOTF for the HDR video is configured by the following exponentiation function and linear function.

In the exponentiation function, an exponentiation of 1.2, where 100% is 1, to an input signal level of the HDR video having a range from a point of 0%, where an expression range of an input signal level of the SDR video is 100%, to a change point optionally determined within a range of 100% to 500% is calculated.

In the linear function, an input signal level of the HDR video having a range higher than the change point is multiplied by a predetermined coefficient to maintain a change rate of a calculation result in a portion of the change point calculated by using the exponentiation function.

As an example of the linear function, in a case where the change point is a point of 300%, E is an input signal level of the HDR video (value normalized when 100% is 1), and E' is a display luminance value as a calculation result, the following expression is obtained.

$$E'=-0.2*3^{1.2}+1.2*3^{0.2}*E$$

Further, in a case where the change point is a point of 500%, E is an input signal level of the HDR video (value normalized when 100% is 1), and E' is a display luminance value as a calculation result, the following expression is obtained.

$$E'=-0.2*5^{1.2}+1.2*5^{0.2}*E$$

Next, the change point described above will be examined.

Figure 6:
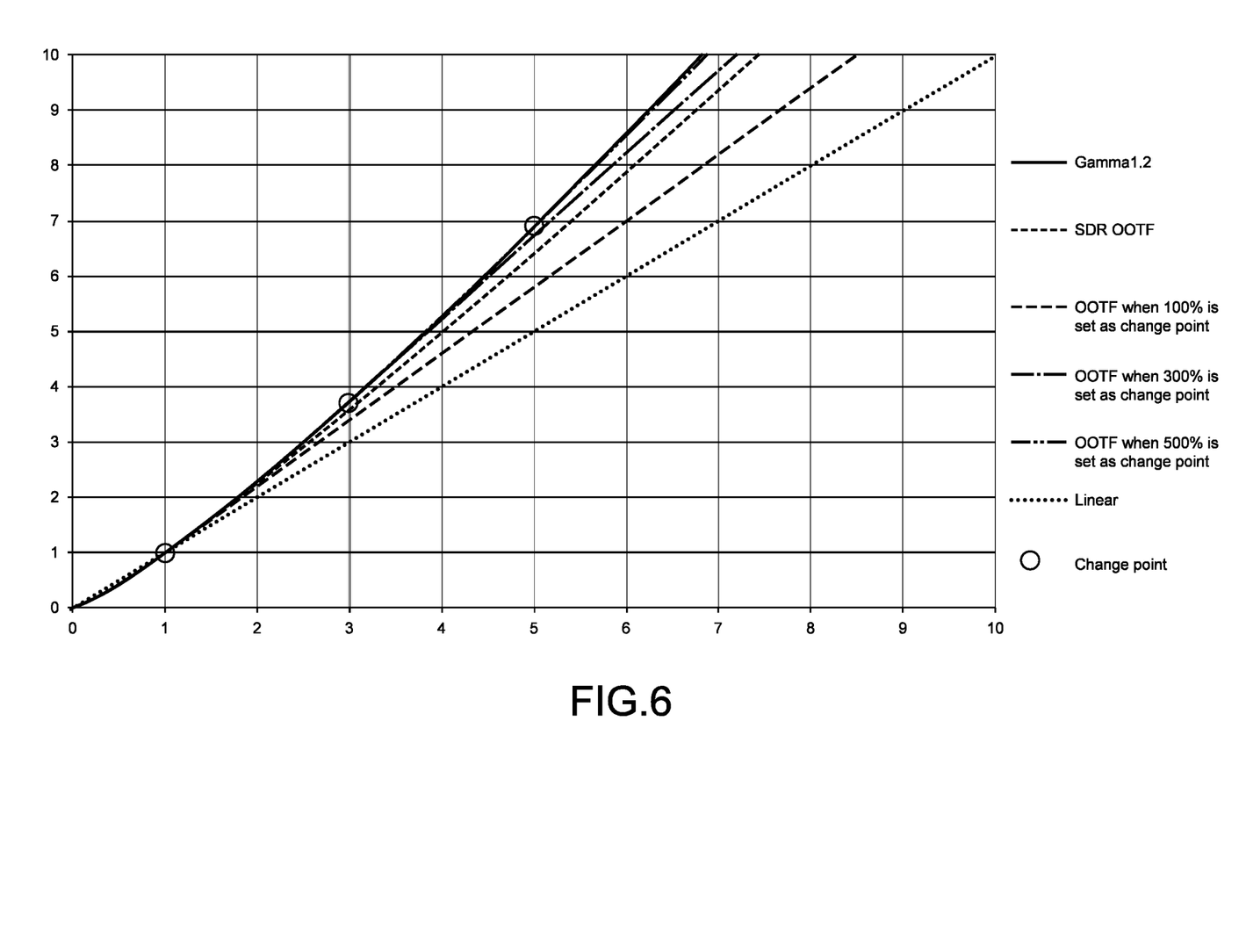
FIG. 6 is a graph showing that the OOTF characteristics obtained when a change point is given to each of the positions of 100%, 300%, and 500% are compared with the OOTF characteristics for the SDR video.

FIG. 6 is a graph showing that the OOTF characteristics obtained when the change point is given to each of the positions of 100%, 300%, and 500% are compared with the OOTF characteristics for the SDR video.

As shown, the OOTF characteristics for the HDR video in the range from the input signal level of 0% to the input signal level of 100% is closely analogous to the OOTF characteristics for the SDR video by the exponentiation function described above. Thus, the difference between the visibility of the HDR video and the visibility of the SDR video on the monitor in the range from the input signal level of 0% to the input signal level of 100% is eliminated.

Further, linear characteristics are given by the linear function described above in the range where the input signal level is higher than the change point. Accordingly, the following advantages are obtained: the characteristics obtained by calculating an exponentiation of 1.2 to an input signal level in the entire range by using only the exponentiation function have an increasing rise rate of the display luminance value as the input signal level falls within a higher range, and a clip region of the input signal level is widened as much; when the range where the input signal level is higher than the change point is provided with the above-mentioned linear characteristics, the rise rate of the display luminance value can be made constant in the range where the input signal level is high, and the clip region of the input signal level can be reduced.

MODIFIED EXAMPLE 1

Figure 7:
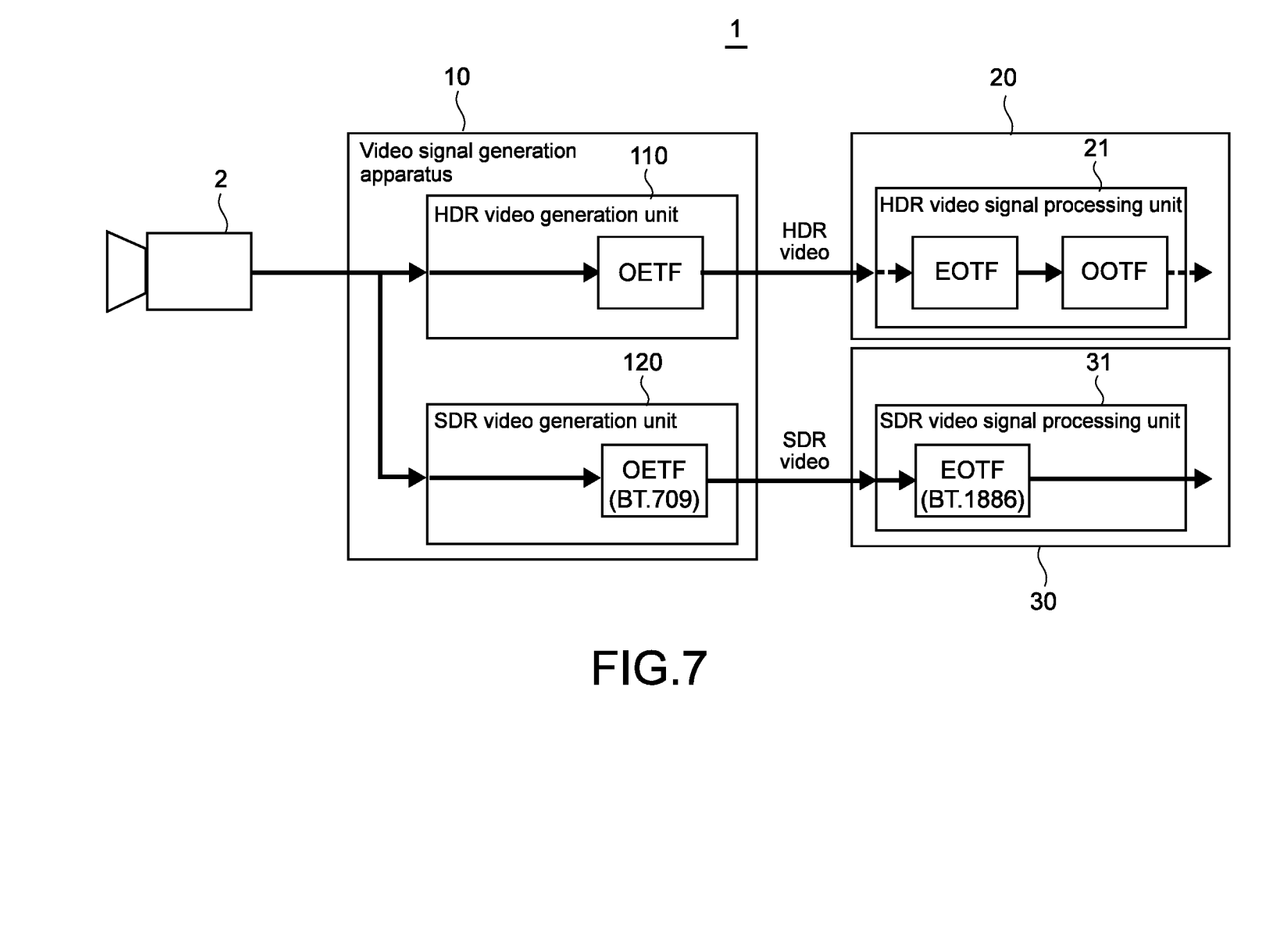
FIG. 7 is a block diagram showing a modified example according to the present technology.

In the embodiment described above, the OOTF conversion for the HDR video is performed by the video signal generation apparatus 10. However, this OOTF conversion can also be performed by an HDR video signal processing unit 21 of the HDR monitor 20 as shown in FIG. 7. In this case, the OOTF conversion is performed on an HDR video signal that has been subjected to EOTF conversion in the HDR video signal processing unit 21 of the HDR monitor 20.

It should be noted that the present technology can also have the following configurations.

(1) A video signal processing apparatus, including
an HDR video generation unit including
a first converter unit that performs OOTF conversion on an HDR video by using an exponentiation function for calculating an exponentiation of 1.2, where 100% is 1, to an input signal level of the HDR video having a range from a point of 0%, where an expression range of an input signal level of an SDR video is 100%, to a change point optionally determined within a range of 100% to 500%, and by using a linear function for multiplying an input signal level of the HDR video having a range higher than the change point by a predetermined coefficient to maintain a change rate of a calculation result in a portion of the change point calculated by using the exponentiation function.

(2) The video signal processing apparatus according (1), further including
an SDR video generation unit including
a second converter unit that performs OETF conversion of ITU-R BT.709 on an input video signal to generate an SDR video.

(3) The video signal processing apparatus according to (1) or (2), in which
the video signal processing apparatus is configured to simultaneously generate the HDR video and the SDR video from the input video signal.

(4) A video signal processing method, including
performing OOTF conversion on an HDR video by using an exponentiation function for calculating an exponentiation of 1.2, where 100% is 1, to an input signal level of the HDR video having a range from a point of 0%, where an expression range of an input signal level of an SDR video is 100%, to an change point optionally determined within a range of 100% to 500%, and by using a linear function for multiplying an input signal level of the HDR video having a range higher than the change point by a predetermined coefficient to maintain a change rate of a calculation result in a portion of the change point calculated by using the exponentiation function.

(5) The video signal processing method according to (4), in which
OETF conversion of ITU-R BT.709 is performed on an input video signal to generate an SDR video.

(6) The video signal processing method according to (4) or (5), in which
the HDR video and the SDR video are simultaneously generated from the input video signal.

(7) A video signal processing system, including:
a video signal generation apparatus that generates an HDR video and an SDR video;
an HDR monitor that performs signal processing for displaying the HDR video generated by the video signal generation apparatus on a first monitor; and
an SDR monitor that performs signal processing for displaying the SDR video generated by the video signal generation apparatus on a second monitor,
the video signal generation apparatus including
an HDR video generation unit including
a first converter unit that performs OOTF conversion on the HDR video by using an exponentiation function for calculating an exponentiation of 1.2, where 100% is 1, to an input signal level of the HDR video having a range from a point of 0%, where an expression range of an input signal level of the SDR video is 100%, to a change point optionally determined within a range of 100% to 500%, and by using a linear function for multiplying an input signal level of the HDR video having a range higher than the change point by a predetermined coefficient to maintain a change rate of a calculation result in a portion of the change point calculated by using the exponentiation function, and
an SDR video generation unit including
a second converter unit that performs OETF conversion of ITU-R BT.709 on an input video signal to generate an SDR video,
the SDR monitor including
an SDR video signal processing unit that performs gamma processing using an EOTF of ITU-R BT.1886 on the SDR video generated by the video signal generation apparatus.

(8) The video signal processing system according to (7), further including
an SDR video generation unit including
a second converter unit that performs OETF conversion of ITU-R BT.709 on an input video signal to generate an SDR video.

(9) The video signal processing system according to (7) or (8), in which
the video signal processing system is configured to simultaneously generate the HDR video and the SDR video from the input video signal.

REFERENCE SIGNS LIST 1 video signal processing system
10 video signal generation apparatus
20 HDR monitor
21 HDR video signal processing unit
30 SDR monitor
31 SDR video signal processing unit
110 HDR video generation unit
115 OOTF unit
116 OETF unit
120 SDR video generation unit
126 gamma processing unit

The invention claimed is:

1. A video signal processing apparatus to generate HDR video for display on an HDR monitor, the apparatus comprising:
   first circuitry configured to perform an Opto-Optical Transfer Function (OOTF) conversion, by using a predetermined function, on an input video signal having a range from a predetermined reference point to a change point selectively determined, the OOTF conversion being analogous to OOTF conversion for an SDR video, wherein the change point of the range of the input video signal is a point selectively determined within a range of 100% to 500% from a point of 0% in the input video signal, wherein an expression range of an input signal level of the SDR video is expressed as 100%; and
   second circuitry configured to perform an Opto-Electronic Transfer Function (OETF) conversion on an output of the first circuitry and generate the HDR video for display on the HDR monitor.

2. The video signal processing apparatus according to claim 1, wherein the first circuitry is further configured to perform the OOTF conversion of linear characteristics on the input video signal having a range higher than the change point.

3. The video signal processing apparatus according to claim 2, wherein the OOTF conversion of linear characteristics performed by the first circuitry is conversion using a linear function multiplying a predetermined coefficient to maintain a change rate of a calculation result in a portion of the change point calculated by using the predetermined function.

4. The video signal processing apparatus according to claim 1, wherein the predetermined reference point of the range of the input video signal is a point of 0% in the input video signal, wherein an expression range of an input signal level of the SDR video is expressed as 100%.

5. The video signal processing apparatus according to claim 1, wherein the predetermined function used by the first circuitry is an exponentiation function for calculating an exponentiation of 1.2, where a point of 100% is 1, in the input video signal, wherein an expression range of an input signal level of the SDR video is expressed as 100%.

6. The video signal processing apparatus according to claim 1, further comprising third circuitry configured to perform an OETF conversion on the input video signal to generate the SDR video.

7. The video signal processing apparatus according to claim 6, wherein the video signal processing apparatus is configured to simultaneously generate the HDR video and the SDR video from the input video signal.

8. A video signal processing method to generate HDR video for display on an HDR monitor, comprising
   performing an Opto-Optical Transfer Function (OOTF) conversion, by using a predetermined function, on an input video signal having a range from a predetermined reference point to a change point selectively determined, to generate a first signal, the OOTF conversion being analogous to OOTF conversion for an SDR video, wherein the change point of the range of the input video signal is a point selectively determined within a range of 100% to 500% from a point of 0% in the input video signal, wherein an expression range of an input signal level of the SDR video is expressed as 100%;
   performing an Opto-Electronic Transfer Function (OETF) conversion on the first signal to generate a second signal; and
   generating the HDR video from the second signal for display on the HDR monitor.

9. A video signal processing system, comprising:
   a video signal generation apparatus that generates an HDR video and an SDR video;
   an HDR monitor that performs signal processing to display the HDR video generated by the video signal generation apparatus on a first monitor; and
   an SDR monitor that performs signal processing to display the SDR video generated by the video signal generation apparatus on a second monitor,
   the video signal generation apparatus including
      HDR video generation circuitry including
         first circuitry configured to perform an OOTF conversion, by using a predetermined function, on an input video signal having a range from a predetermined reference point to a change point selectively determined, the OOTF conversion being analogous to OOTF conversion for the SDR video, and
      SDR video generation circuitry including
         second circuitry configured to perform an OETF conversion on the input video signal to generate the SDR video,
   the SDR monitor including
      SDR video signal processing circuitry configured to perform gamma processing using an EOTF on the SDR video generated by the video signal generation apparatus.

* * * * *